(12) United States Patent
Tokiwa

(10) Patent No.: US 8,813,620 B2
(45) Date of Patent: Aug. 26, 2014

(54) MAIN BODY VISE DEVICE IN BAND SAW MACHINE

(75) Inventor: Toru Tokiwa, Kanagawa (JP)

(73) Assignees: Amanda Company, Limited, Kanagawa (JP); Amada Machine Tools Company, Ltd., Kanagawa (JP)

(*) Notice: Subject to any disclaimer, the term of this patent is extended or adjusted under 35 U.S.C. 154(b) by 210 days.

(21) Appl. No.: 13/498,352

(22) PCT Filed: Sep. 30, 2010

(86) PCT No.: PCT/JP2010/067050
§ 371 (c)(1), (2), (4) Date: Mar. 27, 2012

(87) PCT Pub. No.: WO2011/043238
PCT Pub. Date: Apr. 14, 2011

(65) Prior Publication Data
US 2012/0180611 A1    Jul. 19, 2012

(30) Foreign Application Priority Data
Oct. 9, 2009    (JP) .................................. 2009-235183

(51) Int. Cl.
B26D 7/02    (2006.01)
B26D 7/04    (2006.01)
B23D 55/04    (2006.01)

(52) U.S. Cl.
CPC ...................................... B23D 55/04 (2013.01)
USPC ................. 83/375; 83/390; 83/788; 269/153; 269/221

(58) Field of Classification Search
USPC ........... 83/375, 377, 382, 383, 384, 385, 388, 83/389, 390, 795, 796, 452, 456, 466; 269/25, 27, 43, 45, 71, 55, 32, 110, 269/152, 153, 154, 155, 221, 223, 222
See application file for complete search history.

(56) References Cited

U.S. PATENT DOCUMENTS

| | | | | |
|---|---|---|---|---|
| 490,519 | A * | 1/1893 | Wayland | 269/145 |
| 2,769,224 | A * | 11/1956 | Hake | 269/23 |
| 3,820,773 | A * | 6/1974 | Aizawa | 269/32 |
| 3,862,583 | A * | 1/1975 | Tsuchiya | 83/796 |
| 4,241,630 | A * | 12/1980 | Moriya | 83/409 |
| 4,558,614 | A * | 12/1985 | Harris | 83/56 |

(Continued)

FOREIGN PATENT DOCUMENTS

| | | |
|---|---|---|
| JP | 04-082615 | 3/1992 |
| JP | 6-23386 | 6/1994 |

(Continued)

OTHER PUBLICATIONS

Japan Office action, mail date is Oct. 8, 2013.

*Primary Examiner* — Kenneth E. Peterson
*Assistant Examiner* — Jennifer Swinney
(74) *Attorney, Agent, or Firm* — Greenblum & Bernstein, P.L.C.

(57) ABSTRACT

Disclosed is a main body vise device (7) in a band saw machine, characterized in that: a movable main body vise body (33) is provided to a main body vise bed (31); an upstream movable vise jaw (37) is provided integrally to this main body vise body (33), while a downstream movable vise jaw (41) is movably provided on a downstream side of the main body vise body (33); a first pressing/biasing module (43) capable of advancing and retreating the main body vise body (33) is provided; and a second pressing/biasing module (45) capable of advancing and retreating the downstream movable vise jaw (41) independently of the upstream movable vise jaw (37) is provided.

5 Claims, 7 Drawing Sheets

(56) References Cited

U.S. PATENT DOCUMENTS

| | | | |
|---|---|---|---|
| 4,674,374 A * | 6/1987 | Sadahiro et al. | 83/62.1 |
| 5,755,147 A | 5/1998 | Tsume | |
| 5,823,081 A | 10/1998 | Tsume | |

FOREIGN PATENT DOCUMENTS

| | | |
|---|---|---|
| JP | 8-141830 | 6/1996 |
| JP | 08-141832 | 6/1996 |
| JP | 09-085529 | 3/1997 |
| JP | 09-136217 | 5/1997 |
| JP | 09-150313 | 6/1997 |
| JP | 11-033820 | 2/1999 |
| JP | 11070432 A * | 3/1999 |
| JP | 2000-107932 | 4/2000 |
| JP | 2001-150234 | 6/2001 |

* cited by examiner

MAIN BODY VISE DEVICE IN BAND SAW MACHINE

TECHNICAL FIELD

The present invention relates to a main body vise device in a band saw machine.

BACKGROUND ART

Band saw machines can be roughly classified into "Type 1 to Type 3" on the basis of the installation position of the main body vise device for fixedly clamping a workpiece relative to the band saw blade.

Here, the feeding of a material W to a cutting place by a material feeding vise device 103 is likened to the flow of a river from upstream to downstream. In "Type 1" whose outline is shown in FIG. 1, a main body vise device 101 is disposed in a place upstream of and close to a band saw blade BL guided by saw blade guides 105*l*, 105*r* (for example, Patent Document 1). Incidentally, in FIGS. 2, 3 explaining the outlines of "Types 2, 3" given below, the same components as those of "Type 1" will be denoted by the same reference numerals. Descriptions for such components will be omitted.

In "Type 2" whose outline is shown in FIG. 2, the main body vise device 101 is disposed in a place downstream of and close to the band saw blade BL (for example, Patent Document 2).

"Type 3" whose outline is shown in FIG. 2 is what is termed as a "divided vise," in which the band saw blade BL can run in the middle of the main body vise device 101, and in which the main body vise device 101 is disposed across the band saw blade BL in the upstream and downstream directions (for example, Patent Document 3).

To put it in more detail, the main body vise device 101 has a main body vise body 102, which is movable in the Y-axis direction, on a main body vise bed 100. This main body vise body 102 is integrally provided with: a movable vise jaw 101*u* upstream of the band saw blade BL; and a movable vise jaw 101*d* downstream of the band saw blade BL. The main body vise body 102 is provided to be movable with the movable vise jaws 101*u*, 101*d* by means of a main body vise cylinder 104 in a direction (the Y-axis direction) orthogonal to a material feeding direction (the X-axis direction). In addition, the main body vise bed 100 includes upstream fixed vise jaws 107*u*, 107*d* which are opposed to the movable vise jaws 101*u*, 101*d*.

Between the movable vise jaws 101*u*, 101*d* and the fixed vise jaws 107*u*, 107*d*, there are provided grooves 106, 108 in which the band saw blade BL can run, and spaces which the saw blade guides 105*l*, 105*r* can enter. Thereby, the band saw blade BL can run in the Y-axis direction in the middle of the main body vise device 101.

Each of aforementioned Types 1, 2 has advantages and disadvantages. For example, Type 1 can be used for various purposes, is advantageous to bundle cutting, and allows easy introduction of an automated system including an unloading device. However, after cutting the product, the product remains unclamped in a free state, and Type 1 may damage blade tips of the band saw blade by the interference between the product and the band saw blade BL when lifting the band saw blade BL.

On the other hand, Type 2 has an advantage that the remaining material is shorter in length than the remaining material (L1 plus a clamping margin of the material feeding vise) in Type 1. However, Type 2 is disadvantageous to buddle cutting compared to Type 1. To put it specifically, when automatically operated, the material feeding vise device always needs to clamp materials W by returning to the retreat end on the upstream side before finishing cutting the materials W. Otherwise, a bundle of materials, which is the materials W, will come apart from each other simultaneously with the end of the cutting operation.

PRIOR ART DOCUMENTS

Patent Documents

Patent Document 1: Japanese Patent Application Laid-Open No. 2000-107932
Patent Document 2: Japanese Patent Application Laid-Open No. Hei 08-141830
Patent Document 3: Japanese Examined Utility Model Application Publication No. Hei 06-023386

DISCLOSURE OF THE INVENTION

Technical Problem

In the case of Type 3, the vise jaws are downstream of the band saw blade BL (on the side of the cut product). For this reason, after the cutting operation, the product can be smoothly discharged without being flung by the band saw blade in the Y-axis direction. In addition, Type 3 has characteristics in which, when an end of a workpiece (a discarded material) is cut with the workpiece fed from the front side (from the downstream side) of the band saw blade BL, the clamping work is easy and the cut product upstream of the band saw blade BL is not flung in the Y-axis direction, for example. However, when positioning the next product, the material feeding vise device 103 is likely to fail in the positioning.

As shown in Patent Document 3 (Japanese Examined Utility Model Registration Application Publication No. Hei 06-023386), a hydraulic cylinder (33) for moving movable vise jaws (33) toward and away from fixed vise jaws (31) is provided in a location offset from the place where a saw blade (11) runs. For this reason, when only the product on the downstream side is clamped, the material W on the upstream side is not clamped. Accordingly, when a material feeding vise device (not illustrated) moves upstream for the purpose of fed-material positioning of a material W after the cutting operation, the material feeding vise device is likely to move the material W slightly upstream. In other words, because the material feeding vise device moves the reference position for the cutting by the band saw blade, the failure in the positioning occurs.

For this reason, in the case of the divided vise, as shown in FIG. 3, a space a needs to be provided between the downstream movable vise jaw 101*d* and the material W, which will be cut into a product P, in order that the material W should be securely clamped with the upstream vise jaw 101*u*.

However, the provision of the space a makes it impossible to clamp the cut product completely, and the product may fall over the band saw blade after the end of the cutting operation, and accordingly may damage the blade tips of the saw blade when the band saw blade BL is lifted.

The present invention has been made in order to solve the foregoing problems. Hence, an object of the present invention is to provide a main body vise device in a band saw machine, the device including a divided vise which does not cause the failure in the positioning when the material feeding vise device positions the next product.

Technical Solution

In order to achieve the above object, a first aspect of the present invention provides a main body vise device in a band saw machine, the device including the following components: a main body vise bed; a main body vise body movably provided to the main body vise bed; an upstream movable vise jaw integrally provided to the main body vise body, and opposed to an upstream fixed vise jaw; a downstream movable vise jaw movably provided on a downstream side of the main body vise body, and opposed to a downstream fixed vise jaw; a first pressing/biasing module configured to bias the main body vise body in a way that enables the main body vise body to advance and retreat; and a second pressing/biasing module configured to bias the downstream movable vise jaw in a way that enables the downstream movable vise jaw to advance and retreat independently of the upstream movable vise jaw.

A second aspect of the present invention which is dependent on the first aspect provides the main body vise device in a band saw machine, wherein a pressing force of the first pressing/biasing module is larger than a pressing force of the second pressing/biasing module.

A third aspect of the present invention which is dependent on the first aspect or the second aspect provides the main body vise device in a band saw machine, wherein the first pressing/biasing module and the second pressing/biasing module each include a fluid pressure cylinder.

A fourth aspect of the present invention which is dependent on any of the first aspect to the third aspect provides the main body vise device in a band saw machine, wherein the second pressing/biasing module is a spring configured to always pressingly bias the downstream movable vise jaw toward the downstream fixed vise jaw.

Advantageous Effects

The main body vise devices in a band saw machine respectively based on the present invention as recited in the foregoing first to fourth aspects employ the advantages of the divided vise, and do not cause the failure in the positioning when the material feeding vise device positions the next product. In addition, the main body vise devices securely clamp the cut product, and are accordingly capable of preventing blade tips from being damaged due to the interference which would occur between the saw blade and the cut product if the saw blade were flung by the band saw blade in the Y-axis direction.

BEST MODES FOR CARRYING OUT THE INVENTION

Descriptions will be hereinbelow provided for embodiments of the present invention by use of the drawings.

Figure 8:
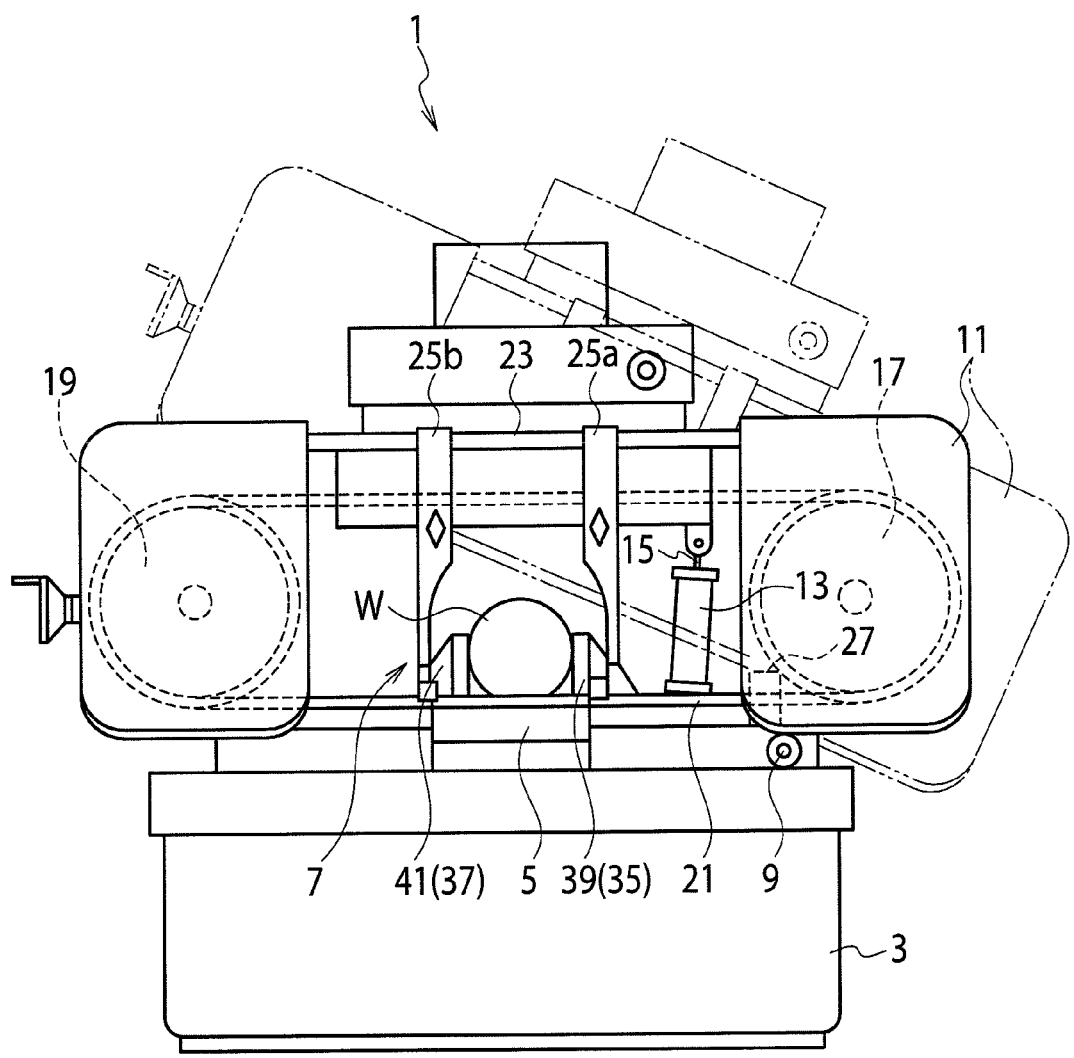
FIG. 8 shows an example of a horizontal band saw machine including the main body vise device in the band saw machine according to the invention as claimed in the application concerned.

FIG. 8 shows a horizontal band saw machine 1 as an example of a band saw machine including a main body vise device 7 according to the invention as claimed in the application concerned. This horizontal band saw machine 1 includes a base 3 shaped like a box. The base 3 is provided with a table 5 configured to support a material W.

The base 3 is provided with a saw blade housing 11 which is swingable in the vertical direction with the assistance of a hinge shaft 9. In addition, a raising/lowering cylinder 13 is provided in an appropriate location on the base 3 for the purpose of swinging this saw blade housing 11. A piston rod 15 capable of projecting upward from this raising/lowering cylinder 13 is connected to an appropriate location on the saw blade housing 11.

A drive wheel 17 and a driven wheel 19 are rotatably provided inside the saw blade housing 11. An endless band saw blade 21 is wound around the drive and driven wheels 17, 19. Incidentally, the drive wheel 17 is linked and connected to a rotary driving apparatus (whose illustration is omitted).

Furthermore, paired saw blade guides 25a, 25b are provided to a beam member 23 attached to the saw blade housing 11 in the positions adjustable for the purpose of holding the band saw blade 21 perpendicularly to the material W supported by the table 5. Incidentally, the saw blade guide 25a is immovable, while the saw blade guide 25b is movable in the left and right directions in which the saw blade guide 25b moves closer to and away from the saw blade guide 25a.

Figure 1:
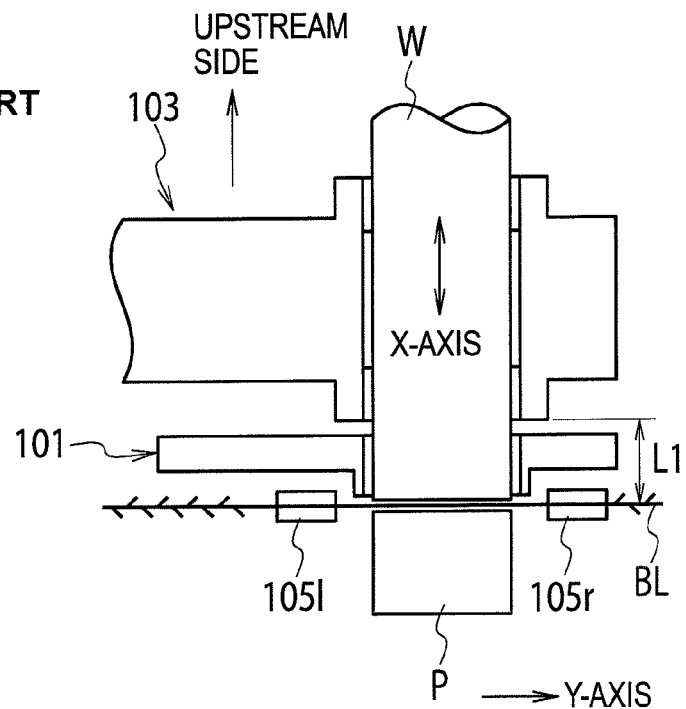
FIG. 1 is an explanatory drawing of "Type 1" in which a main body vise device 101 is disposed in a place upstream of and close to a band saw blade BL.
Figure 2:
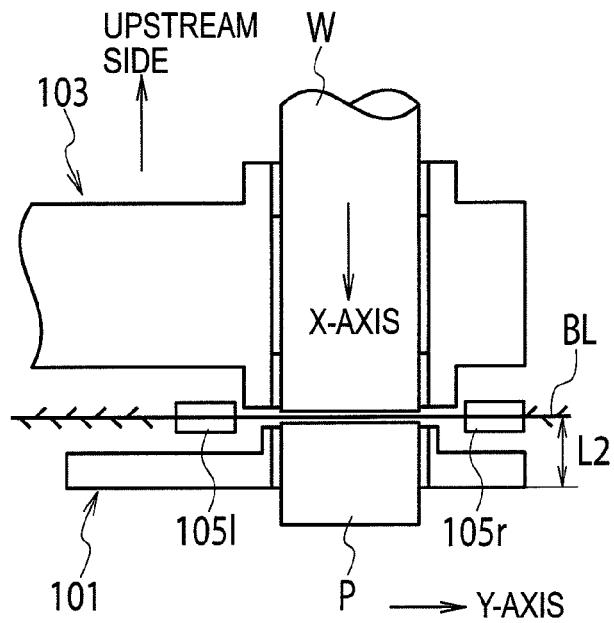
FIG. 2 is an explanatory drawing of "Type 2" in which the main body vise device 101 is disposed in a place downstream of and close to the band saw blade BL.
Figure 3:
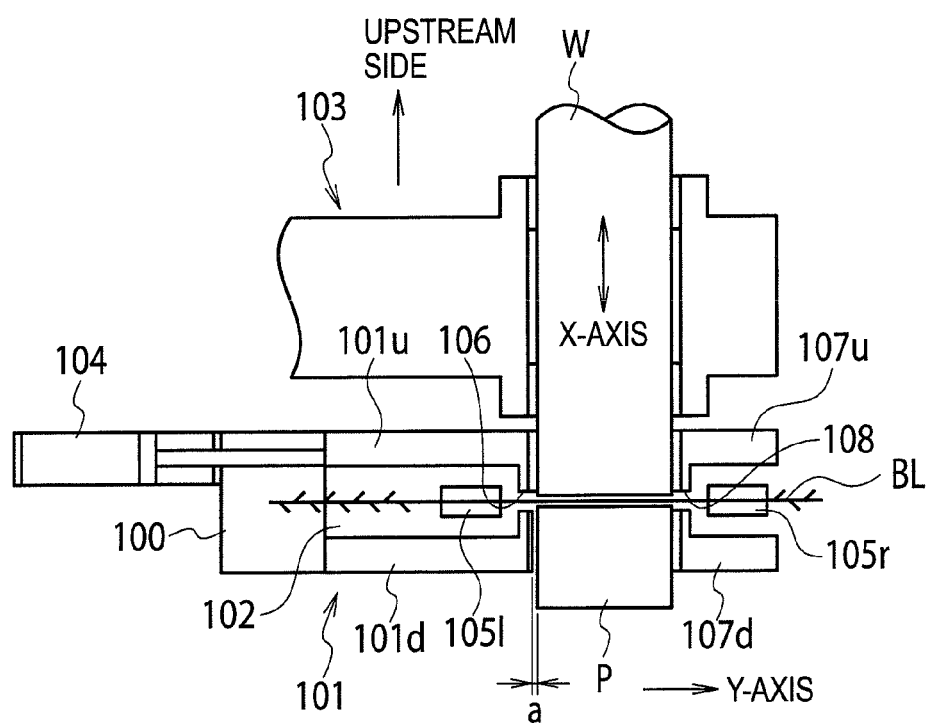
FIG. 3 is an explanatory drawing of "Type 3" in which the main body vise device 101 is disposed across the band saw blade BL in upstream and downstream directions.
Figure 4:
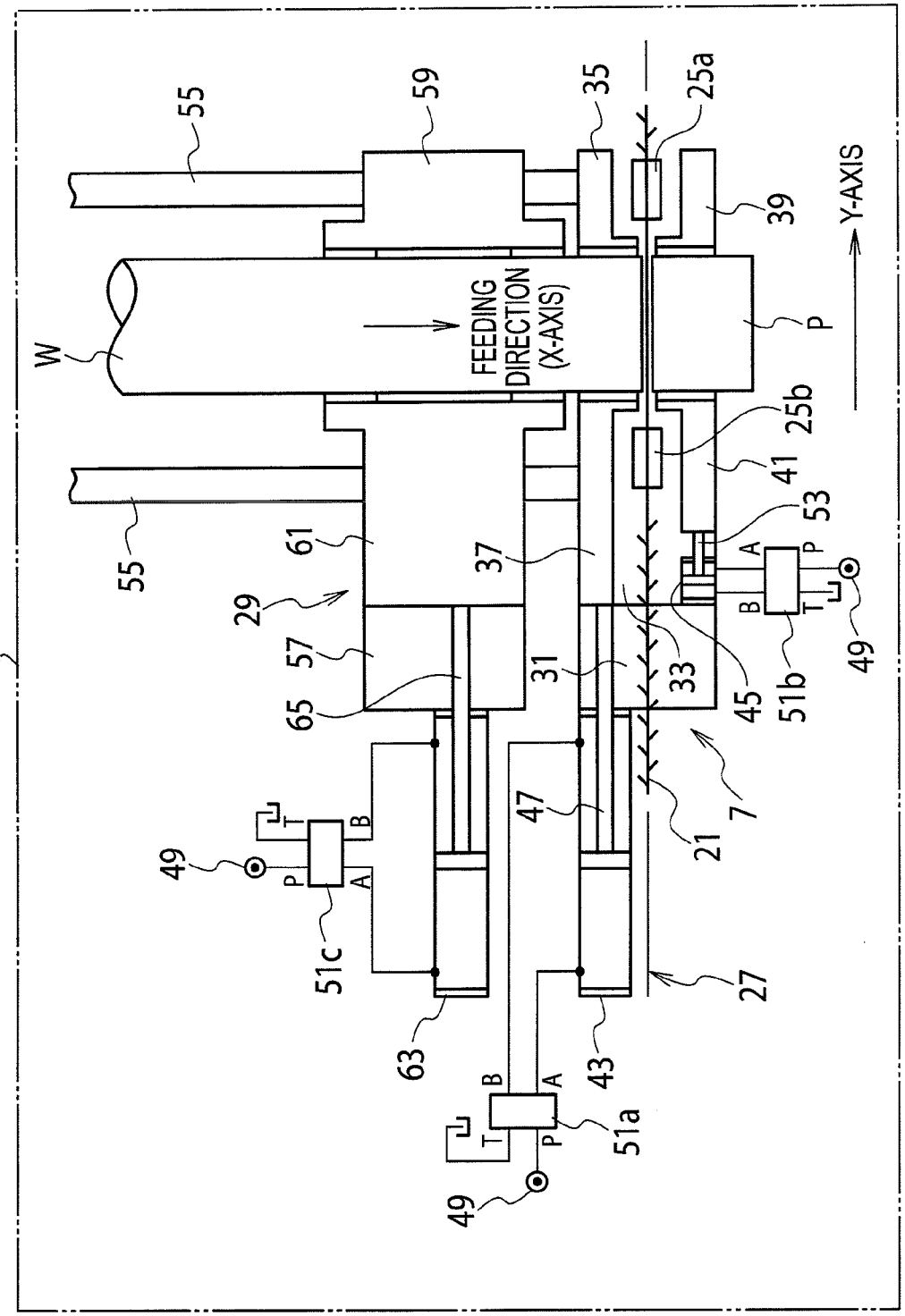
FIG. 4 is an explanatory drawing of an embodiment of a main body vise device in a band saw machine according to the invention as claimed in the application concerned.

FIG. 4 is a plan view of the horizontal band saw machine 1, and shows the configuration and placement of the main body vise device 7 and a material feeding vise device 29 with respect to a cutting reference position 27 which is a position where the band saw blade 21 cuts the material W.

As shown in FIG. 4, the configuration of the main body vise device 7 is as follows. A main body vise bed 31 is provided on the base 3 across the cutting reference position 27 in the upstream and downstream directions. A main body vise body 33 movable in a direction orthogonal to the material feeding direction is provided on this main body vise bed. An upstream movable vise jaw 37 opposed to an upstream fixed vise jaw 35 is provided integrally to an upstream side of this main body vise body. A downstream movable vise jaw 41 movable closer to and away from a downstream fixed vise jaw 39 is provided on a downstream side of this main body vise body. A first hydraulic cylinder 43 is provided as a first pressing/biasing module configured to advance and retreat the main body vise body 33 to and from the upstream and downstream fixed vise jaws 35, 39. A second hydraulic cylinder 45 is provided as a second pressing/biasing module configured to advance and retreat the downstream movable vise jaw 41 to and from the downstream fixed vise jaw 39.

A piston rod 47 of the first hydraulic cylinder 43 is connected to the main body vise body 33. When a direction selector valve 51a connected to a hydraulic pressure source 49 is switched as needed, both of the upstream movable vise jaw 37 provided integrally to the main body vise body 33 and the downstream movable vise jaw 41 can be advanced to and retreated from the opposed upstream and downstream fixed vise jaws 35, 39.

Furthermore, a piston rod 53 of the second hydraulic cylinder 45 is connected to the downstream movable vise jaw 41. Similarly, when a direction selector valve 51b connected to the hydraulic pressure source 49 is switched as needed, the downstream movable vise jaw 41 can be advanced to and retreated from the opposed downstream fixed vise jaw 39 independently of the upstream movable vise jaw 37.

It should be noted that in the main body vise device 7, a pressing force F1 of the first hydraulic cylinder 43 as the first pressing/biasing module is set larger than a pressing force F2 of the second hydraulic cylinder 45 as the second pressing/biasing module.

The material feeding vise device 29 is provided upstream of the main body vise device 7 (in the upper portion of FIG. 4). The material feeding vise device 29 is provided on a material feeding vise bed 57 which is guided movably in the X-axis direction by paired guide rails 55 laid on the base 3 and extending in parallel with the X-axis direction (in the material feeding direction).

A fixation-side vise 59 integrally provided to this material feeding vise bed 57 and a movement-side vise 61 capable of advancing to and retreating from the fixation-side vise 59 are provided on the material feeding vise bed 57. Moreover, the material feeding vice bed 57 is provided with a hydraulic cylinder 63 as driving means configured to advance and retreat the movement-side vice 61. A piston rod 65 of this hydraulic cylinder 63 is connected to the movement-side vise 61.

The hydraulic cylinder 63 is connected to a direction selector valve 51c which is connected to the hydraulic pressure source 49. When this direction selector valve 51c is switched as needed, the piston rod 65 can be advanced and retreated, and accordingly the material W can be clamped and unclamped.

It should be noted that a hydraulic cylinder (whose illustration is omitted) is provided as driving means configured to make the material feeding vise bed 57 reciprocate in the X-axis direction (in the material feeding direction).

When cutting the product, the main body vise device in a band saw machine having the foregoing configuration clamps the material W on the upstream side between the upstream fixed vise jaw and the upstream movable vise jaw which exerts the pressing force F1, and clamps the product P situated on the downstream side between the downstream fixed vise jaw and the downstream movable vise jaw which are capable of independently performing the clamping operation with the pressing force F2 weaker than the pressing force F1 exerted by the upstream fixed vise jaw and the upstream movable vise jaw. For this reason, the main body vise device is capable of securely clamping the product P situated on the downstream side.

In sum, because the product P continues to be securely clamped after end of the cutting operation, blade tips of the saw blade will not be damaged when the band saw blade is lifted, and it is possible to prevent blade tips from being damaged due to the interference which would occur between the saw blade and the product if the saw blade were flung by the band saw blade in the Y-axis direction. In addition, when positioning the next product, the material feeding vise device will not cause the failure in the positioning.

Figure 5:
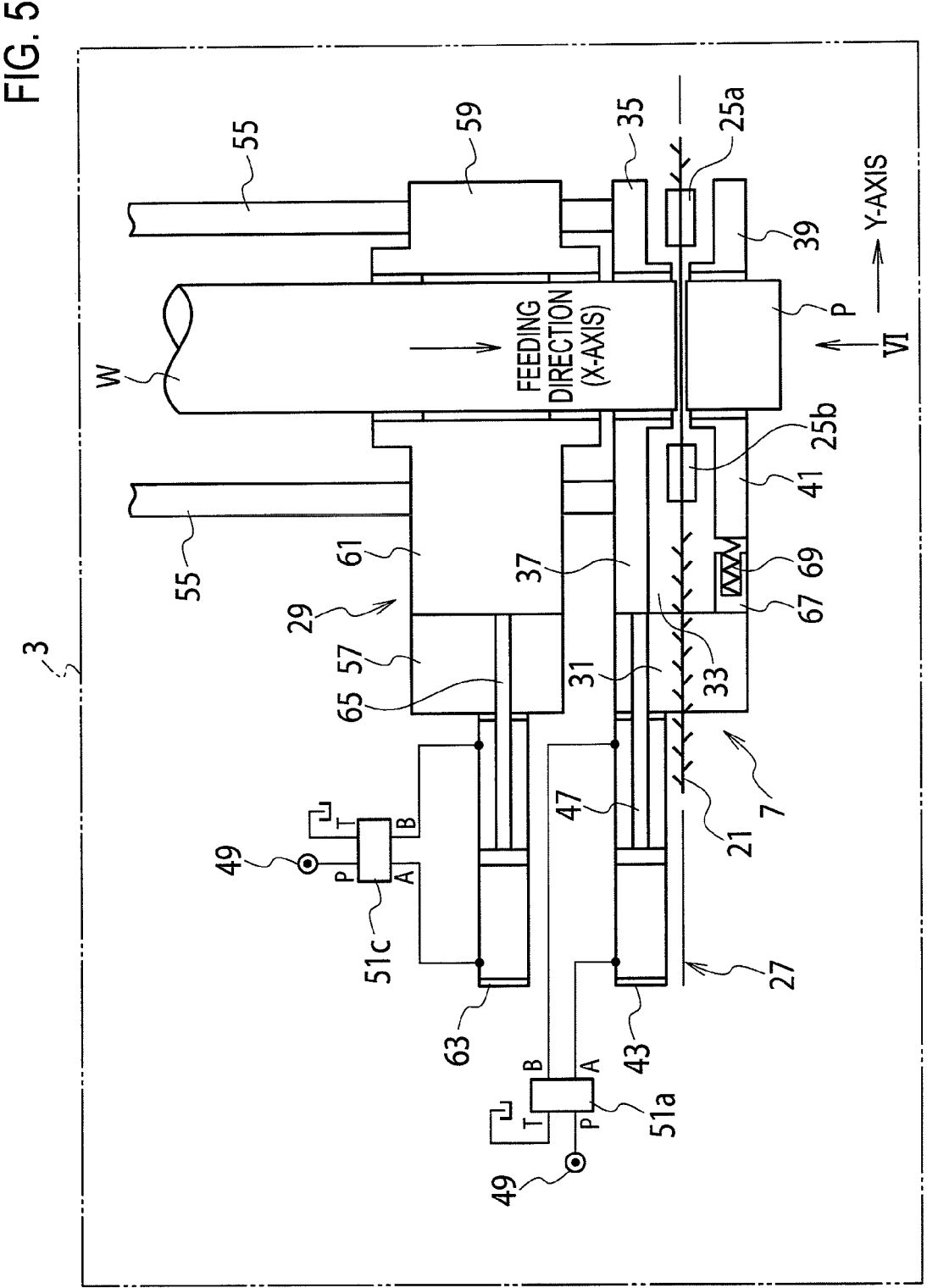
FIG. 5 is an explanatory drawing of a different embodiment of the main body vise device in the band saw machine according to the invention as claimed in the application concerned.

FIG. 5 is an explanatory diagram of a different embodiment of the main body vise device in a band saw machine according to the invention as claimed in the application concerned.

The embodiment shown in FIG. 5 is that which is obtained by making slight changes to the embodiment shown in FIG. 4 given above. Components which are the same as those of the embodiment shown in FIG. 4 will be denoted by the same reference numerals, and descriptions for such components will be omitted.

The difference between the embodiment shown in FIG. 5 and the embodiment shown in FIG. 4 is as follows. Instead of the second hydraulic cylinder 45 as the second pressing/biasing module configured to press the downstream movable vise jaw 41, a spring receiver 67 is provided to the main body vise body 33, and a spring 69 is resiliently set between this spring receiver 67 and the downstream movable vise jaw 41, so that the downstream movable vise jaw 41 is always biased with the pressing force F2 toward the downstream fixed vise jaw 39.

It should be noted that the amount of stroke of the downstream movable vise jaw 41 is restricted by a stopper (whose illustration is omitted) lest the downstream movable vise jaw 41 should come off the main body vise body 33.

Figure 6:
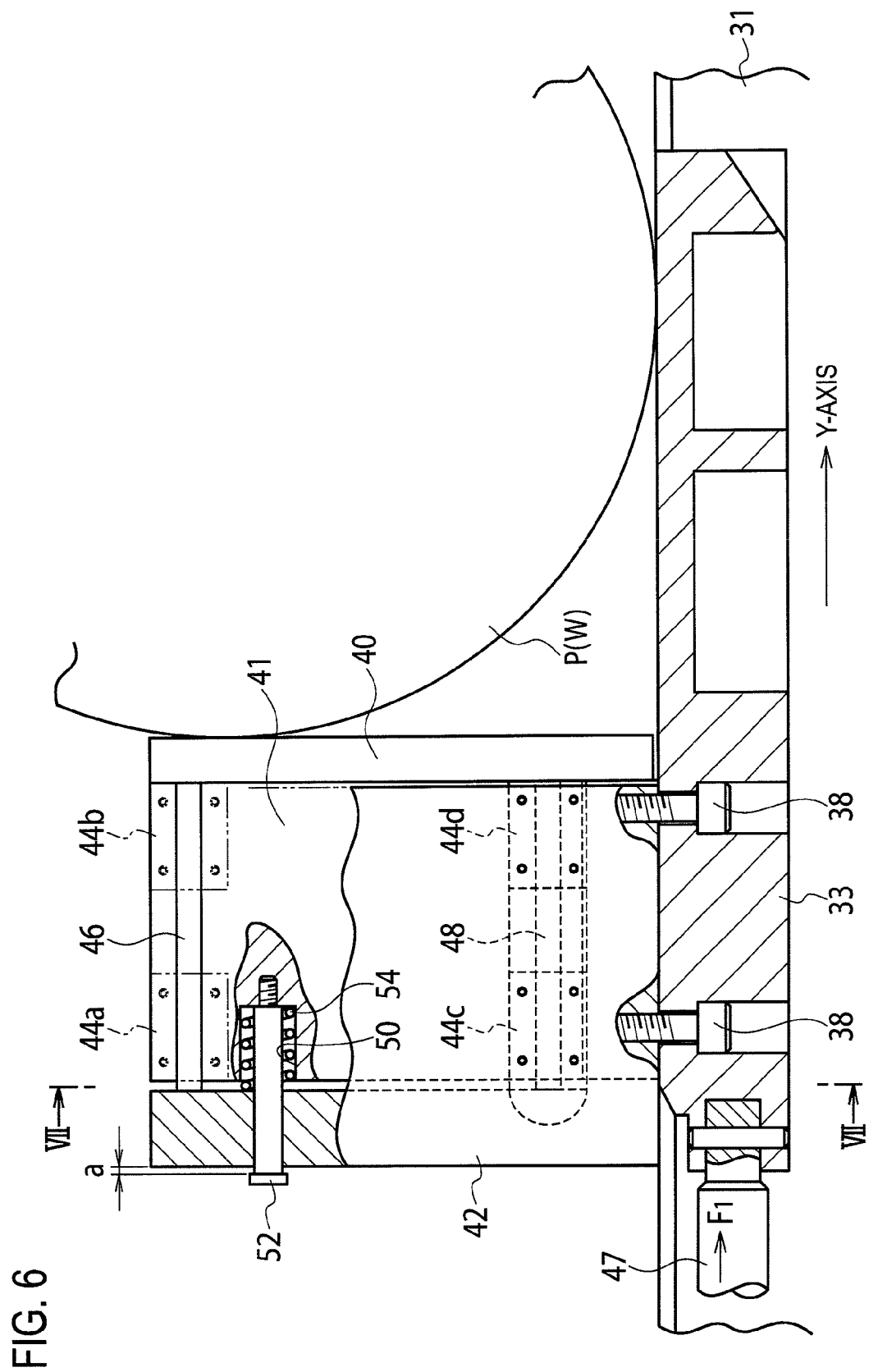
FIG. 6 is an explanatory drawing representing a detailed drawing (an example) of the different embodiment, and is an arrow view taken along the VI line of FIG. 5.
Figure 7:
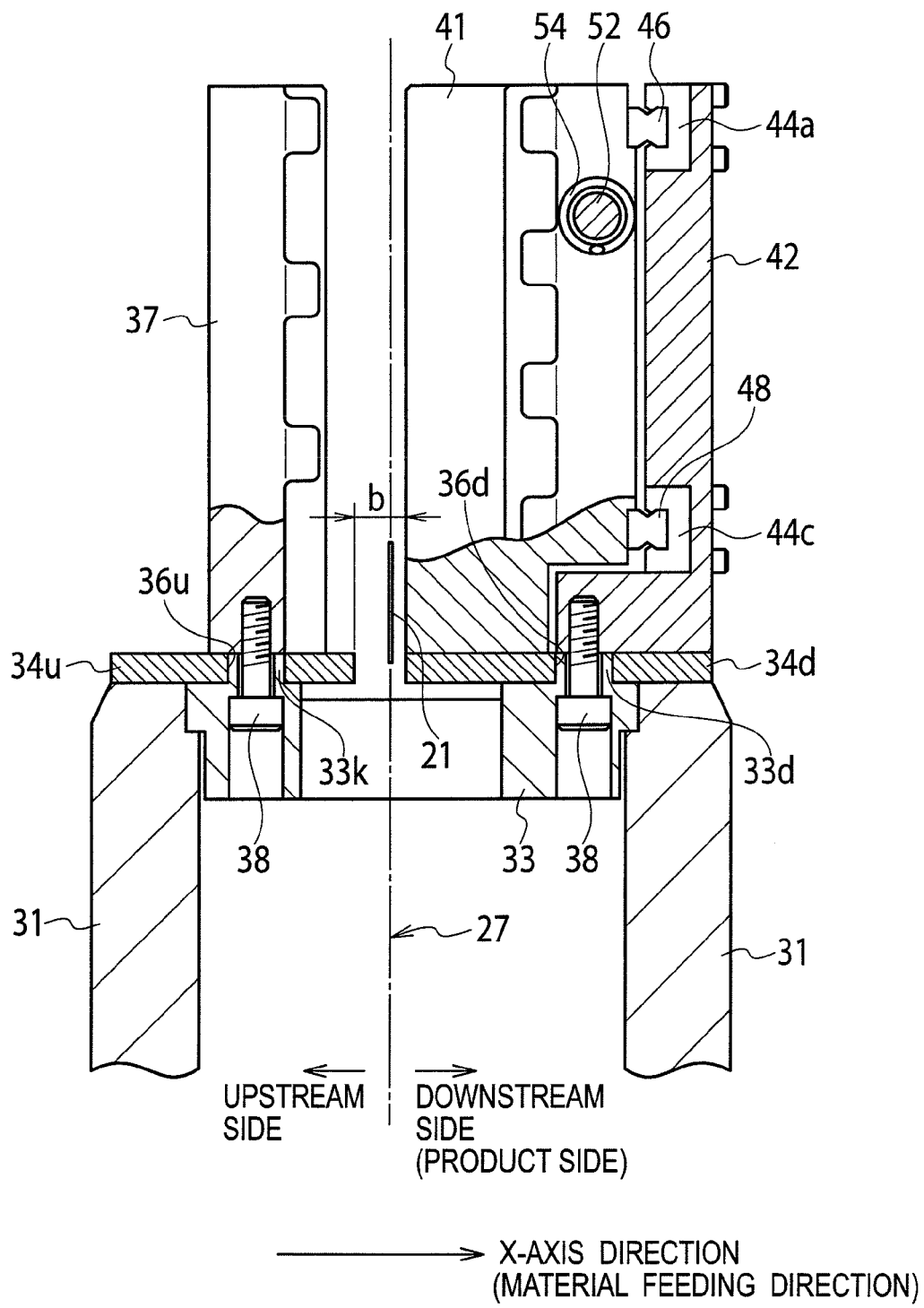
FIG. 7 is an arrow view taken along the VII-VII line of FIG. 6.

FIG. 6 and FIG. 7 show in detail part which is related to the upstream movable vise jaw 37 and the downstream movable vise jaw 41 of the main body vise device 7 of the different embodiment shown in FIG. 5. Incidentally, components which have the same operation/working-effect as do those shown in FIG. 5 are given the same reference numerals as are those shown in FIG. 5.

Referring to FIG. 6 and FIG. 7, the main body vise body 33 is supported on the upper portion of the main body vise bed 31 in a way slidable in the Y-axis direction. In addition, an upstream material receiving plate 34u configured to support a material-side portion of a cut part of the material W and a downstream material receiving plate 34d configured to support the product are fixed to the respective upper-surface portions of the main body vise bed 31 with a space b, through which the band saw blade 21 is capable of passing, provided between the upstream material receiving plate 34u and the downstream material receiving plate 34d.

An engagement protrusion 33k engagingly in contact with the undersurface of the upstream movable vise jaw 37 is provided to the upstream upper surface of the main body vise body 33. This engagement protrusion 33k and the upstream movable vise jaw 37 are integrally connected and fixed together by use of a bolt 38 via a through-hole 36u which is provided to the upstream material receiving plate 34u.

In addition, a vise jaw guide 42 configured to guide the downstream movable vise jaw 41 toward the downstream fixed vise jaw 39 (in the Y-axis direction) is integrally fixed to an engagement protrusion 33d of the main body vise body 33 by use of another bolt 38 via a through-hole 36d which is provided to the downstream material receiving plate 34d. Incidentally, the heights of the downstream movable vise jaw 41 and the vise jaw guide 42 from the downstream material receiving plate 34d are set equal to each other.

Furthermore, paired guide members 44a, 44b configured to guide the downstream movable vise jaw 41 in the Y-axis direction are attached to the upper portion of the vise jaw guide 42 by use of another bolt. Moreover, similarly, paired guide members 44c, 44d are attached to the lower portion of the vise jaw guide 42 by use of another bolt.

An upper guide rail 46 engaging with the guide members 44a, 44b in the upper portion of the vise jaw guide 42 and a lower guide rail 48 engaging with the guide members 44c, 44d are integrally fixed to the downstream movable vise jaw 41. Besides, a vise plate 40 is provided on the front surface of the downstream movable vise jaw 41 (by the side of the product). Similarly, a vise plate (whose illustration is omitted) is provided on the front surface of the upstream movable vise jaw 37 (by the side of the material).

In addition, the downstream movable vise jaw 41 is provided with a counter bore 50, which is arranged in parallel with the upper and lower guide rails 46, 48 and in a direction in which the counter bore 50 is getting farther away from the downstream fixed vise jaw 39, in an appropriate position between the upper guide rail 46 and the lower guide rail, in the case of the example, in a height position closer to the upper guide rail 46 in the upper portion of the downstream movable vise jaw 41.

A stud bolt 52 having a stem extending to the bottom portion of this counter bore 50 after penetrating the vise jaw guide 42 is screwed to the counter bore 50. In addition, a spring 54 configured to always pressingly bias the downstream movable vise jaw 41 toward the downstream fixed vise jaw 39 is attached to the stem of the stud bolt 52 between the counter bore 50 provided to the downstream movable vise jaw 41 and the vise jaw guide 42.

It should be noted that the space between the head of the stud bolt 52 and the vise jaw guide 42 is set at a in the state in which the upstream movable vise jaw 37 presses down the material W with the pressing force F1. In other words, in this event, the left end portions (on the left side in FIG. 6) of the upper and lower guide rails 46, 48 are in the state of being engagingly in contact with the vise jaw guide 42. The spring 54 is set to have a pressing force which is equal to F2 and satisfies F1>F2 while the spring 54 deforms in this state.

All the contents of Japanese Patent Application No. 2009-235183 (filed on Oct. 9, 2009) are incorporated in the application concerned by reference thereto.

The present invention is not limited to what have been described with regard to the foregoing embodiments of the invention. The present invention can be carried out in various other modes by making changes to the present invention depending on the necessity.

The invention claimed is:

1. A main body vise device in a band saw machine, comprising:
    a main body vise bed;
    a main body vise body movably provided to the main body vise bed;
    an upstream movable vise jaw integrally provided to the main body vise body, and opposed to an upstream fixed vise jaw;
    a downstream movable vise jaw movably provided on a downstream side of the main body vise body, and opposed to a downstream fixed vise jaw;
    a first pressing/biasing module configured to bias the main body vise body to enable the main body vise body to advance and retreat; and
    a second pressing/biasing module configured to bias the downstream movable vise jaw, movably provided on the main body vise body, to enable the downstream movable vise jaw to advance and retreat independently of the upstream movable vise jaw.

2. The main body vise device in a band saw machine according to claim 1,
    wherein a pressing force of the first pressing/biasing module is larger than a pressing force of the second pressing/biasing module.

3. The main body vise device in a band saw machine according to claim 2,
    wherein the first pressing/biasing module and the second pressing/biasing module each include a fluid pressure cylinder.

4. The main body vise device in a band saw machine according to claim 3,
    wherein the second pressing/biasing module is a spring configured to always pressingly bias the downstream movable vise jaw toward the downstream fixed vise jaw.

5. The main body vise device in a band saw machine according to claim 1,
    wherein the first pressing/biasing module and the second pressing/biasing module each include a fluid pressure cylinder.

* * * * *

UNITED STATES PATENT AND TRADEMARK OFFICE
CERTIFICATE OF CORRECTION

PATENT NO. : 8,813,620 B2
APPLICATION NO. : 13/498352
DATED : August 26, 2014
INVENTOR(S) : T. Tokiwa It is certified that error appears in the above-identified patent and that said Letters Patent is hereby corrected as shown below:

On the Title Page, (73) Assignees, the first Assignee listed as "Amanda Company, Limited" should be --Amada Company, Limited--.

Signed and Sealed this
Tenth Day of March, 2015

Michelle K. Lee
*Deputy Director of the United States Patent and Trademark Office*